(No Model.)
F. F. MATTOON.
PLANE HOLDER.
No. 323,517. Patented Aug. 4, 1885.
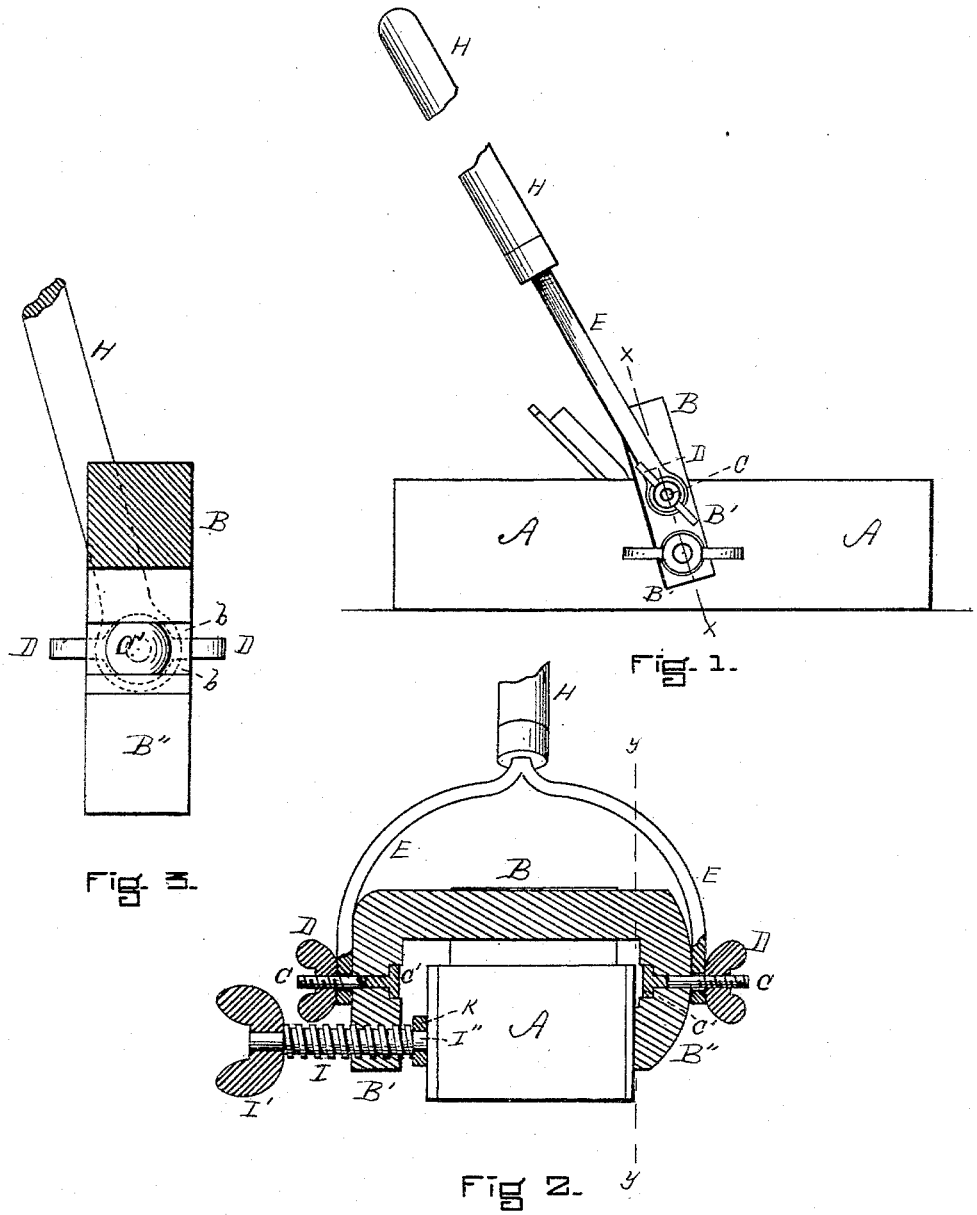

UNITED STATES PATENT OFFICE.

FRANK F. MATTOON, OF BOSTON, MASSACHUSETTS.

PLANE-HOLDER.

SPECIFICATION forming part of Letters Patent No. 323,517, dated August 4, 1885.

Application filed February 16, 1885. (No model.)

*To all whom it may concern:*

Be it known that I, FRANK F. MATTOON, of Boston, (Somerville,) in the county of Middlesex and State of Massachusetts, have invented new and useful Improvements in Plane-Holders, of which the following is a specification.

This is an adjustable holder provided with a long handle intended to be applied to planes when they are to be used for planing floors, in order that the operator may be enabled to work without stooping or bending, and thus plane the floor in an erect position, thereby saving labor and much weariness and accomplishing more work in a given length of time.

In the accompanying drawings, in which similar letters of reference indicate like parts, Figure 1 is a side elevation of my device applied to a plane, the handle being represented as broken out. Fig. 2 is a cross-vertical section on line $x$, Fig. 1. Fig. 3 is a section on line $y$, Fig. 2.

A is a plane constructed in the ordinary manner.

B is a frame, preferably metallic, of substantially the shape shown, and provided with the legs B' and B''.

C C are screws or bolts passing through horizontal openings in the legs B' B'', their heads C' being preferably squared and fitting in the grooves $b$, cut on the inner sides of said legs, so that the screws will not turn in their places. On the outer or threaded portions of the screws are placed correspondingly-threaded thumb-pieces D. Arms E, provided with suitable openings at their lower ends, through which said screws pass, extend from the screws, between the legs B' B'' and the thumb-pieces D, upward, as shown, and meet above the frame, and are held in any ordinary manner in the handle H, which is of sufficient length to be conveniently held by a man in an erect position.

I is a set-screw passing through the leg B', as shown, which is correspondingly threaded and provided with a fixed thumb-piece, I'. The inner end of this screw is provided with a bearing, I'', upon which is loosely placed the ring K.

The plane is held between the inner face of the leg B'' and the parts I'' and K on the screw I, and of course is readily removable by loosening said screw. If the plane is a long one the thumb-pieces D need not be turned up hard against the arms E, so that said arms will be loose and free to turn on the screws C; but if the plane is a short one it is somewhat liable to jump, instead of accommodating itself smoothly to the surface of the floor; hence the thumb-pieces D are, with such a plane, turned tightly against the arms E, pressing them against the outer sides of the legs B' and B'', thus making the handle rigid at the desired angle with the frame and plane, so that the tendency to jump may be controlled by the operator. Of course the handle may be of any desired length, and the arms E inserted therein in any suitable manner.

Having thus fully described my invention, what I claim, and desire to secure by Letters Patent, is—

1. The herein-described improved plane-holder, consisting, essentially, of the following parts, viz: the frame B, provided with the embracing-legs B' B'', the set-screw I, provided with a thumb-piece and extending horizontally through the leg B', whereby the plane is clamped between said set-screw and the opposite leg, B'', the long handle H, the spreading-arms E E, meeting in said handle and extending down on opposite sides of the frame, and the pivots or screws C, extending outward from the legs into the lower ends of the arms, substantially as and for the purpose set forth.

2. The herein-described plane-holder, consisting, essentially, of the following parts, viz: the frame B, provided with the legs B' and B'', grooved at $b$, the screws C, provided with the squared heads C' and thumb-pieces D, the arms E, the long handle H, and set-screw I, constructed and arranged substantially as and for the purpose described.

FRANK F. MATTOON.

Witnesses:
HENRY W. WILLIAMS,
J. M. HARTNETT.